United States Patent [19]

Hoopes et al.

[11] Patent Number: 4,989,411
[45] Date of Patent: Feb. 5, 1991

[54] OVER THE SHAFT FUEL PUMPING SYSTEM

[75] Inventors: Jay N. Hoopes, Tempe; Christopher D. Eick, Phoenix; John R. Williamson, Scottsdale, all of Ariz.

[73] Assignee: Allied-Signal Inc., Morris Township, Morris County, N.J.

[21] Appl. No.: 289,957

[22] Filed: Dec. 27, 1988

[51] Int. Cl.$^5$ ................................................ F02C 1/00
[52] U.S. Cl. .......................................... 60/734; 60/744
[58] Field of Search ..................... 60/39.161, 740, 741, 60/734, 744, 745; 415/225

[56] References Cited

U.S. PATENT DOCUMENTS

| 2,606,501 | 8/1952 | Dreibelbis . | |
|---|---|---|---|
| 2,689,528 | 9/1954 | Rainbow . | |
| 2,778,312 | 1/1957 | Suttle et al. . | |
| 2,956,502 | 10/1960 | Glaser et al. . | |
| 3,576,375 | 4/1971 | Jackson . | |
| 3,871,797 | 3/1975 | Igarashi et al. | 415/55.1 |
| 3,936,240 | 2/1976 | Dochterman | 415/225 |
| 4,386,886 | 6/1983 | Neal | 415/225 |
| 4,769,996 | 9/1988 | Barbeau | 60/745 |
| 4,869,642 | 9/1989 | Williamson et al. | 415/49 |

OTHER PUBLICATIONS

"A Forced Vortex Pump for High Speed, High Pressure, Low Flow Applications" (Thomas Lock) (650502).

Primary Examiner—Leonard E. Smith
Assistant Examiner—Timothy S. Thorpe
Attorney, Agent, or Firm—R. Steve Linne; Jerry J. Holden; James W. McFarland

[57] ABSTRACT

A large flow of high pressure fuel is supplied to a gas turbine engine by mounting a small modified vortex pump over or around a main high speed shaft. The pump includes a plurality of short, stubby impeller blades rotating at a very high speed within a fuel filled annular chamber having an axial fuel inlet and a tangential fuel outlet. A pump booster and priming system ensures the pump fills with fuel during operation.

12 Claims, 3 Drawing Sheets

OVER THE SHAFT FUEL PUMPING SYSTEM

TECHNICAL FIELD

This invention relates generally to rotary fluid pumps and more specifically to the use of a modified forced vortex pump mounted over or around the central high speed shaft of a gas turbine engine for supplying a dependable flow of high pressure fuel or lubricant thereto.

BACKGROUND OF THE INVENTION

Fuel and lubricant pumps for gas turbine engines have typically been offset from the centerline of the engine and driven, along with other accessories, by a gear train connected to the main shaft. See, for example, U.S. Pat. Nos. 3,521,505 and 3,576,375.

Due to the ever increasing number and complexity of engine accessories and the corresponding reduction of available space in the area of the accessory drive mechanism, it would be very desirable to locate such pumps within the main engine core.

Such an approach would not only conserve space but also eliminate the expense and weight of the gear train.

Several approaches have been tried in other types of turbomachinery to achieve similar benefits but the unique characteristics of high performance gas turbine engines prohibit easy adaptations of such prior designs. For example, large (and relatively crude) centrifugal turbopumps have been used to supply large quantities of fuel to the afterburner portion of military turbine engines and to liquid fueled rocket engines. See, for example, U.S. Pat. Nos. 2,606,501; 2,689,528; 2,778,312 and 2,956,502.

High speed, forced vortex pumps have been known since at least the early 1940's when they were investigated by Dr. U. M. Barske for use in rocket propulsion systems but they have not found wide commercial use since, probably because of their unfamiliar pumping characteristics. Physically, they somewhat resemble the common centrifugal pump but they operate on altogether different principles. A centrifugal pump uses a screw-shaped or scrolled impeller to force all the fluid which enters the pump to be thrown outwardly into an annular discharge channel. Since the fluid moves quickly through the pump, the residence time for any particular portion of the fluid is very short, often less than one revolution of the impeller, thus there is a considerable difference in relative speed between the fluid and the impeller. The characteristics of such pumps are generally well-known and they are commonly used to supply very large flows of fluid at low to moderate pressures.

In contrast, a forced vortex pump (not to be confused with a liquid-ring pump) is based on rapidly rotating a body of fluid and withdrawing only a relatively small portion of the fluid so that the remainder may be considered, for design purposes, almost as a rotating solid body. In its original form, such a pump consisted of a rotating drum with baffles or blades fixed to its inside walls for developing the rotating body. Fluid entered the drum through its hub and was picked up near its periphery by a stationary, internal pickup tube which exited the drum through the hub. Difficulties with adapting this design for various applications led to an inverted design in which a simple, straight impeller with long blades was used to create a rapidly rotating fluid vortex within a short cylindrical cavity within a fixed housing surrounding the rotating impeller. The outer portion of the fluid vortex adjacent the smooth housing wall, is at a high pressure while the inner portion is at a much lower pressure. Typically, the high pressure fluid is extracted from the housing through a tangential diffuser section where much of the kinetic energy (velocity) of the fluid is converted to static or potential energy (pressure). The pressure level at the discharge is determined by the diameter and rotational speed of the impeller, while the maximum output flow rate is directly related to the size of the diffuser throat at any given rotational speed. Very small, simple pumps can put out moderate flows at high pressure if all the components are carefully designed. In addition, these pumps can operate satisfactorily at very low input pressures, close to the vapor pressure of the fluid, without cavitation. More importantly, the output pressure is practically constant for all rates of flow at any given speed and the output capacity is approximately proportional to the impeller speed (up to a maximum value determined by the number and size of discharge).

However, such pumps are not readily adaptable to the physical limitations within the core of a gas turbine engine.

In view of the foregoing, it should be apparent that there is a need in the art for improvements in the construction and operation of fuel pumping and supply systems for small high performance gas turbine engines.

It is therefore an object of the present invention to provide improved methods and apparatus for supplying fuel to a gas turbine engine.

A further object of this invention is to provide a simple, highly reliable but low weight fuel supply system based on a modified vortex pump.

It is another object of the invention to provide a pump design which may be mounted in the core of a gas turbine engine over or around the main shaft which connects the compressor to the turbine.

SUMMARY OF THE INVENTION

The present invention aims to overcome the disadvantages of the prior art as well as offer certain other advantages by providing a novel fuel pumping system which includes a small, high speed vortex type pump mounted over or around the shaft connecting the compressor and turbine of a gas turbine engine. Fuel is fed to the pump by a simple injector system which utilizes a portion of the pump output to draw additional fuel from the fuel tank. Since such a system is not self-priming, one means for starting the engine includes a small auxiliary tank of fuel under pressure which is only released for starting. Alternately, a small positive displacement pump may be provided to supply the initial flow of fuel necessary for starting the engine.

The modified vortex fuel pump is very compact and light-weight but provides a relatively constant supply of high pressure fuel over a wide range of output flow rates.

BRIEF DESCRIPTION OF THE DRAWINGS

While this specification concludes with claims particularly pointing out and distinctly claiming the subject matter which is regarded as the invention, it is believed that the objects, features, and advantages thereof may be better understood from the following detailed description of a presently preferred embodiment when taken in connection with the accompanying drawings in which:

DESCRIPTION OF THE PREFERRED EMBODIMENT

Figure 1:
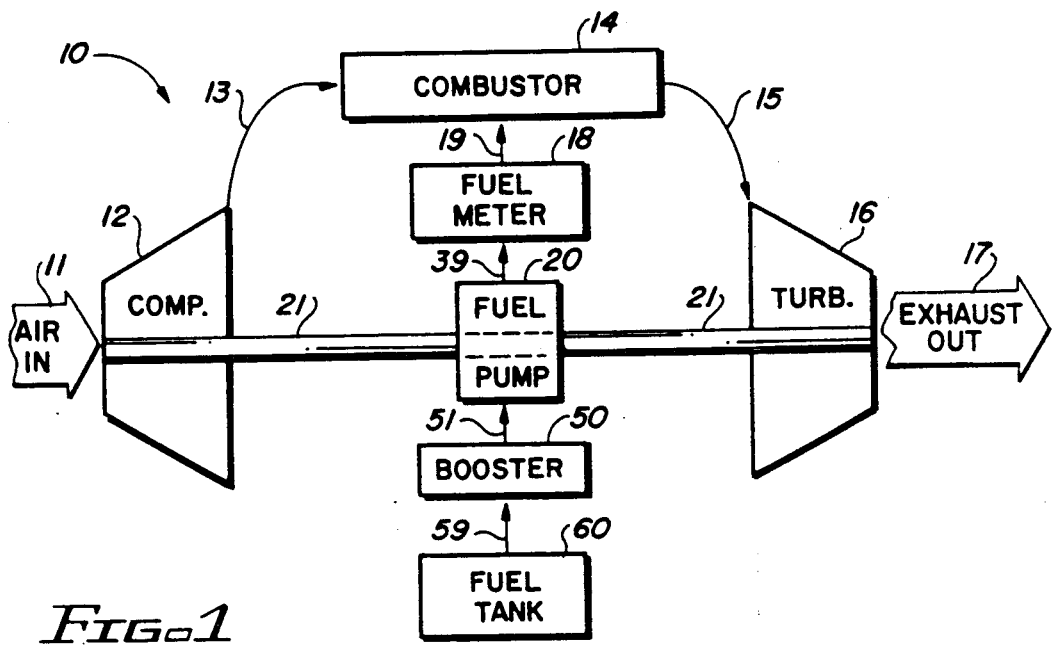
FIG. 1 is a schematic illustration of a gas turbine engine incorporating the present invention.

FIG. 1 schematically illustrates a gas turbine engine incorporating the fuel supply system of the present invention.

The engine 10 includes one or more rotatable compressors 12, a combustor 14, and one or more rotatable turbines 16. A drive shaft 21 mechanically couples the compressor 12 to the turbine 16 and drives a fuel pump assembly 20 which, in accordance with the present invention, surrounds the shaft 21 intermediate the compressor and the turbine. A fuel metering unit 18 is connected between the fuel pump outlet 39 and the combustor fuel inlet 19. Such fuel metering units 18 are well known in the art and need not be described in detail here. See, for example, U.S. Pat. applications Nos. 204,457: 264,235; and 258,232 which are assigned to the assignee of the present invention and incorporated herein by reference. A fuel pressure booster system 50 (described later) is connected between the fuel line 51 to the pump and the outlet 59 of a fuel storage tank 60.

Figure 2:
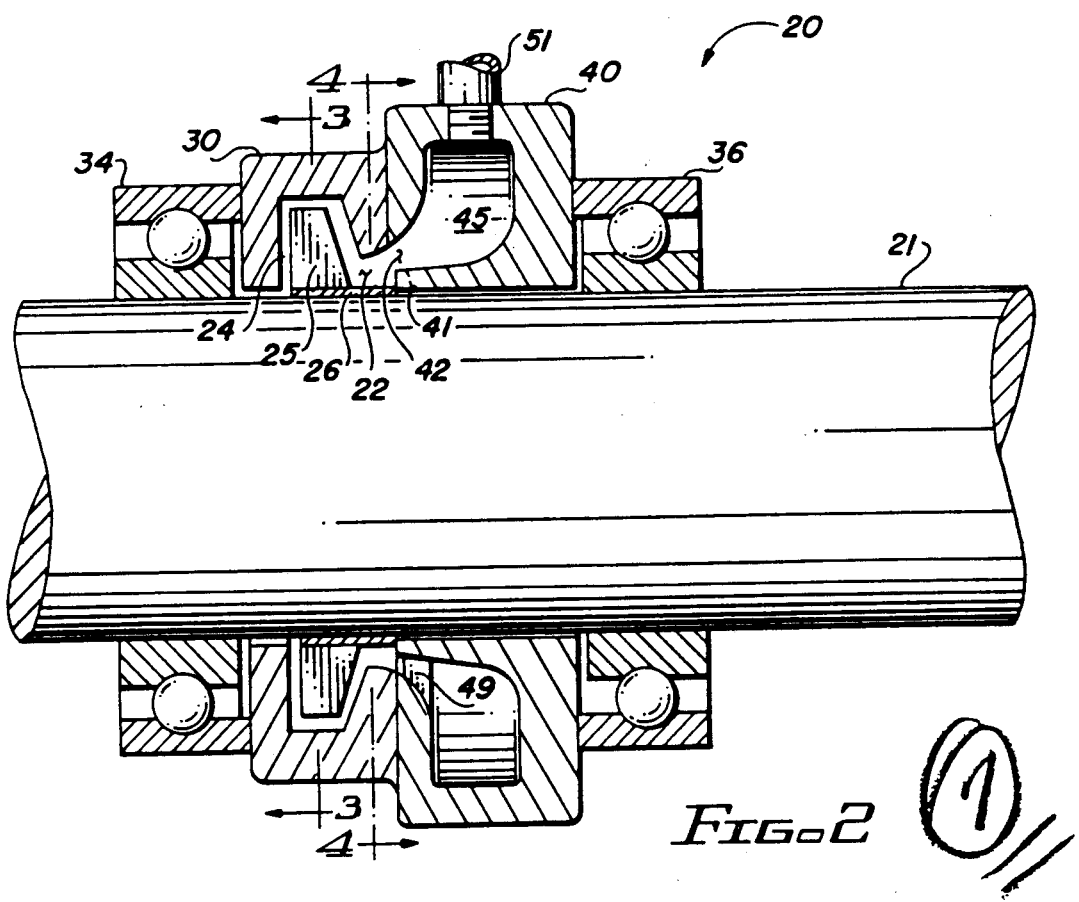
FIG. 2 is an enlarged cross-sectional view of the engine fuel pump assembly.
Figure 3:
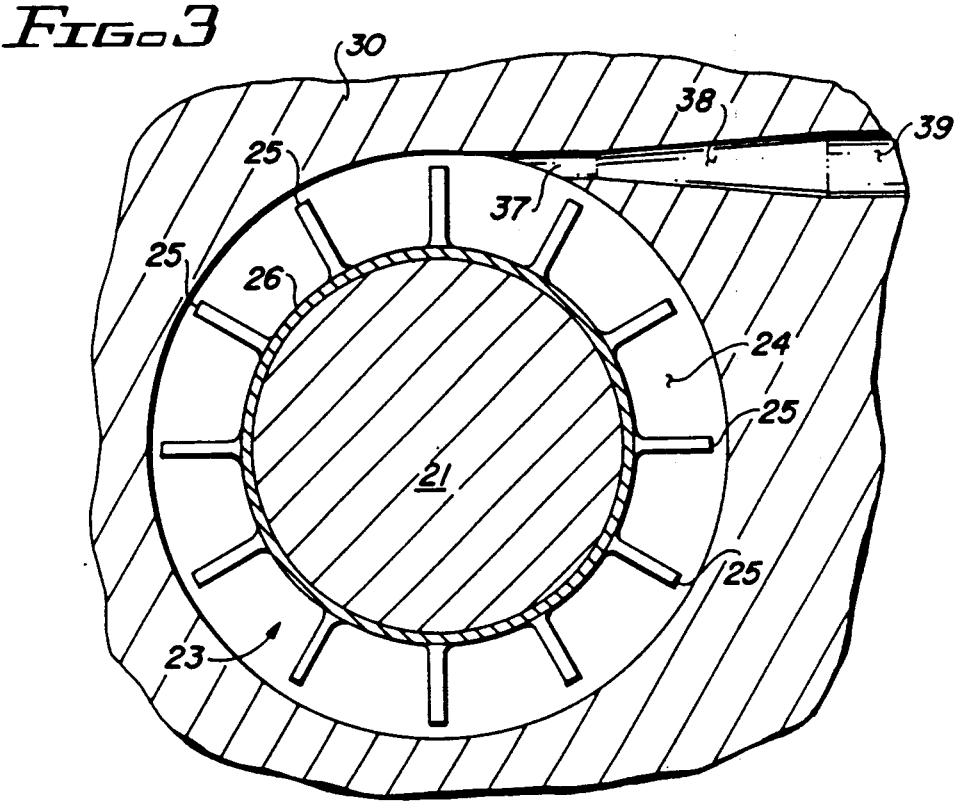
FIG. 3 is a transverse sectional view of the pump along lines 3—3 of FIG. 1.
Figure 4:
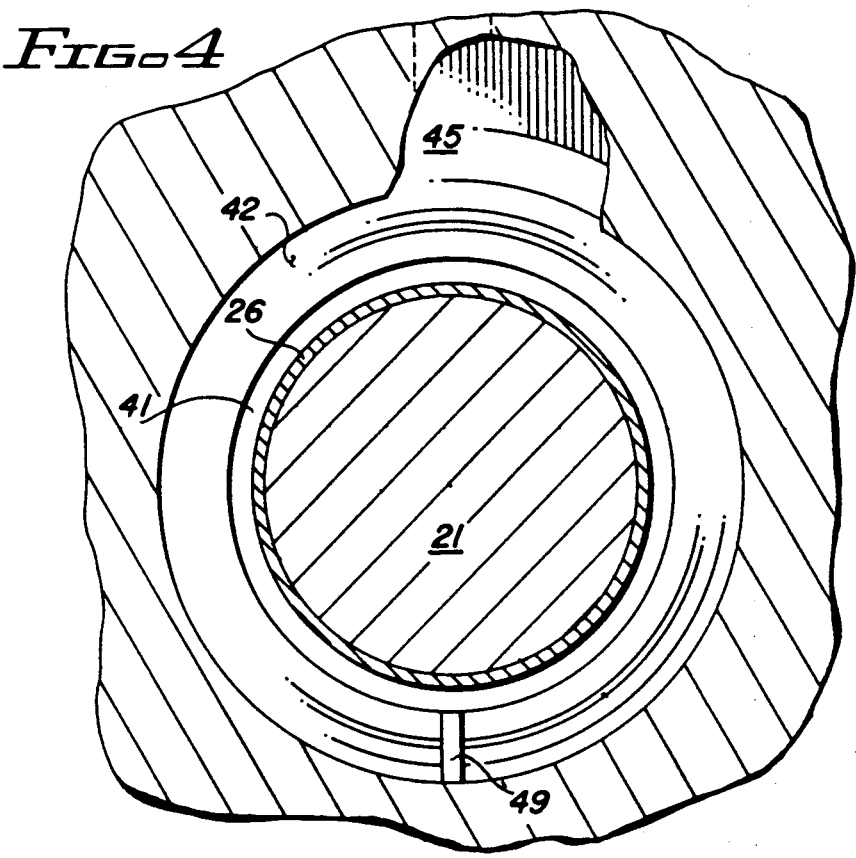
FIG. 4 is a transverse sectional view along lines 4—4 of FIG. 2.

The fuel pump assembly 20, shown more clearly in FIGS. 2, 3 and 4, consists of a vortex impeller 23 girdling the shaft 21 and rotating therewith within an annular cavity 24 formed by a pump housing 30. (Alternately, the cavity 24 may be machined directly into the engine case structure which surrounds the shaft 21 and supports or locates one of the main shaft bearings 34 or 36.)

The vortex impeller 23 has a plurality (preferably 8 to 12) of very short, straight blades 25 extending radially from a thin hub 26 which is mounted over the shaft 21. (Alternately, the blades 25 may be directly fixed to the shaft 21 if disassembly is no problem.)

The pump housing 30 contains one or more fuel outlets each having two sections as shown in FIG. 3. A straight, generally tubular throat section 37 extends tangentially from the periphery of the cavity 24. The throat 37 extends into a conically diverging diffuser section 38 which is in fluid communication with fuel metering unit 18 through conduit 39.

The pump housing 30 has an annular pump inlet aperture 22 closely adjacent the thin hub 26 and/or shaft 21. It is important that the inlet 22 receive an axial flow of fuel into the impeller 23 near the root of the blades 25 so that a proper vortex may be formed in the pump cavity 24. To achieve the proper inflow of fuel, the pump assembly 20 includes a fuel inlet guide body 40 surrounding the shaft 21 and adjacent the pump inlet aperture 22.

Figure 5:
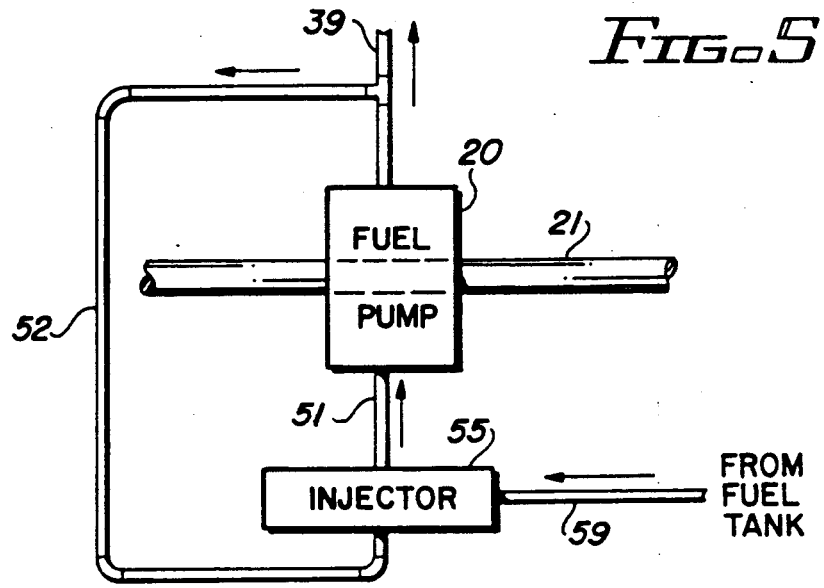
FIG. 5 is a schematic illustration of the injector portion of the fuel booster system.

The guide body 40 contains an annular fuel distribution channel 45 which is separated from the rotating shaft 21 by a shroud or shield 41 formed by the radially innermost portion of the guide body 40. The shroud 41 cooperates with the body 40 to form an axially directed fuel supply passage 42 leading into the pump inlet 22. The passage 42 (or the pump inlet 22) preferably contains at least one radially extending baffle 49 to prevent circumferential fuel flow at the pump inlet. The distribution channel 45 is connected to the fuel line 51 (preferably diametrically opposite the baffle 49) which is in fluid communication with the pressure booster system 50 shown in FIGS. 5, 6 and 7.

Figure 6:
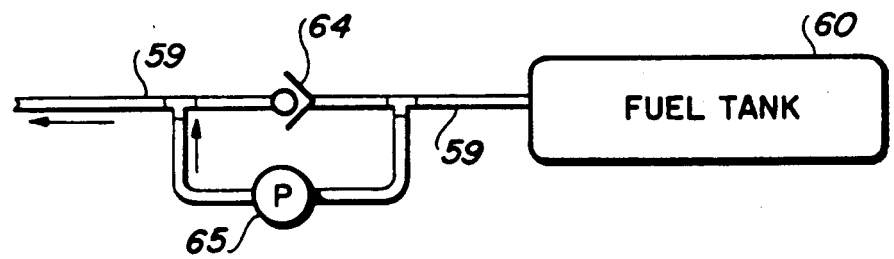
FIG. 6 is a schematic illustration of one fuel priming system.
Figure 7:
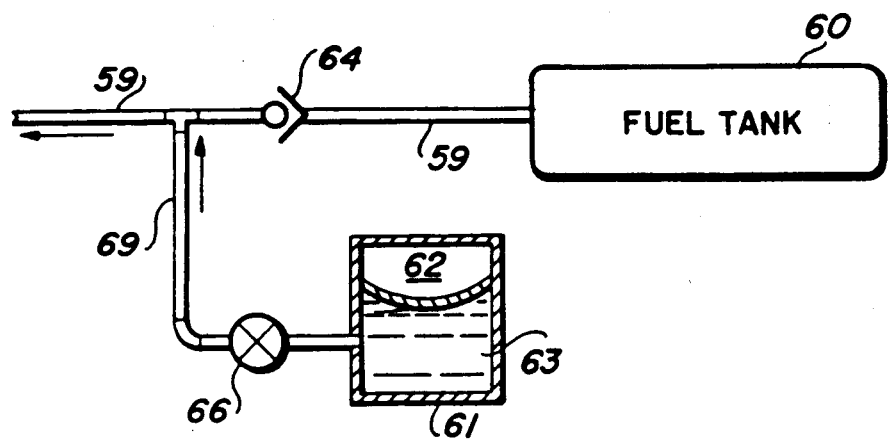
FIG. 7 is a schematic illustration of an alternate fuel priming system.

The pressure booster system 50 includes an injector 55 and one of the fuel priming means shown in either FIG. 6 or FIG. 7. The injector 55, shown in FIG. 5, has an outlet line 51 to the pump and two supply lines 52, 59. A high pressure recirculation line 52 draws fuel from the storage tank 60 through a low pressure line 59 after the engine/pump has started. One priming or starting means, shown in FIG. 6, may be a small, low pressure, positive displacement, electrically driven pump 65 and check valve 64 in fuel line 59.

An alternate priming/starting means, illustrated in FIG. 7, includes a small auxiliary fuel tank 61 containing fuel 63 under pressure, for example by a pressurized inert gas 62, and a pyrotechnic valve 66 in the auxiliary fuel line 69. A check valve 64 prevents auxiliary fuel from flowing into the main fuel storage tank 60 when the pyro valve 66 is opened. Other suitable priming means may be provided if desired and may not even be necessary if the fuel supply tank 60 is located above the engine 10 so that gravity always provides fuel to the pump 20.

To start the engine 10, one of the priming means must be used to initially fill the vortex pump 20 with fuel since such pumps are not self-priming. After starting, the priming system is no longer needed since the flow of high pressure fuel from line 52 through the injector 55 will draw fuel from the tank 60 through line 59 for delivery to the pump 20 through line 51.

During operation of the engine 10, the compressor 12 draws in atmospheric air 11 and delivers a stream of compressed air 13 into the combustor 14. Within the combustor 14, the air 13 is mixed with fuel 19 from the fuel metering unit 18 and burned to produce a hot, high velocity stream of combustion gases 15. Mechanical energy is extracted from the motive gas stream 15 by the rotating turbine 16 before it is jetted from the aft end of the engine. The energy extracted from the exhaust gas stream 17 is transmitted to the rotating compressor 12 by a high speed shaft 21 which also drives the main fuel pump 20 and any other engine accessories (not shown).

The vortex fuel pump 20 supplies a relatively Constant high volume, high pressure stream of fuel through conduit 39 to the fuel metering unit 18 which regulates the amount of fuel flowing into the combustor 14 depending on the needs of the engine. The pump 20 is supplied with a low pressure (e.g. 20 or 30 psi) stream of fuel from the tank 60 by the booster system 50 as described previously.

The operation of the pump assembly 20 may be better understood by considering FIG. 2 in more detail. As the shaft 21 is rotated at very high speed (typically 30,000 to 40,000 rpm) by the turbine 16, fuel within the pump cavity 24 is also rotated by the impeller 23. Since the pressure of a spinning liquid increases approximately according to the square of the radius of revolution, the pressure of the fuel near the tips of the blades 25 will be much greater than near the inlet 22. A useable portion, up to several thousands of pounds per hour, of the high pressure fuel is withdrawn through the tangential outlet 37 (shown in FIG. 3). As the rapidly moving fuel flows through the outlet's diffuser section 38, its pressure is increased still higher. That is, the kinetic energy of velocity is changed into additional static energy or pressure as the fuel flows into line 39. However, it has been found that the outlet pressure is much more sensitive to the inlet conditions for this configuration than for a conventional hubless vortex pump mounted on the end of a shaft. Therefore, the fuel inlet guide body 40 is designed to direct the fuel into the pump inlet 22 in a substantially axial direction (i.e. parallel to the shaft) and also shield the incoming fuel from contact with the rapidly rotating shaft 21 to prevent pre-rotation or swirl at the pump inlet 22. To accomplish this function, fuel entering the guide body 40 from the main fuel line 51 is uniformly distributed around the circumference of the pump inlet 22 within annular channel 45. The fuel exits the channel 45 through an annular slot 42 in the side of the guide body 40 and flows axially into the pump inlet 22. The fuel is prevented from swirling by a shroud 41 (shown in FIG. 2 as the innermost wall or floor of the channel 45) which shields the fuel from the frictional effects of the rotating shaft 21 and by at least one baffle 49 in the body exit slot 42. Of course, the same function could be provided by a circular array of holes drilled axially into the side of chamber 45 and aligned with the pump inlet 22, but the additional friction may become a problem at high flow rates. It is preferred that the body exit slot 42 be smoothly blended into the pump inlet 22.

EXAMPLE

A prototype of the present invention was analyzed to determine some of the characteristics, and thereby illustrate advantages, thereof under the following conditions. An impeller having a hub diameter of about 1.8 inches and a blade diameter of about 2.4 inches was rotated at about 37,000 rpm. The outlet fuel pressure was relatively constant at about 800 psi while delivering fuel at a rate varying from about 500 to over 2000 pounds per hour.

From the foregoing, it should be apparent that the present invention offers simple, compact and highly efficient fuel pumping system for a gas turbine engine.

While in order to comply with the statutes, the present invention has been described in terms more or less specific to one preferred embodiment, it is expected that various alterations, modifications, or permutations thereof will be readily apparent to those skilled in this art. Therefore, it should be limited to the specific features shown or described, but it is intended that all equivalents be embraced within the spirit and scope of the invention as defined by the appended claims.

What is claimed is:

1. Gas turbine engine apparatus comprising: a compressor adapted to compress air inducted into said engine; a combustor adapted to receive and burn a mixture of fuel and compressed air to produce motive gas; a metering valve adapted to receive fuel and deliver said fuel to said combustor; a turbine adapted to receive said motive gas and produce rotary motion in response thereto; a shaft connected to said turbine and said compressor for transmitting said rotary motion to said compressor; and a vortex pump having an impeller girdling said shaft intermediate said compressor and said turbine rotating therewith, a pump inlet adjacent said shaft in fluid communication with a source of said fuel, a pump outlet in fluid communication with said metering valve, and means for defining a flow path between said fuel source and said inlet whereby said fuel is directed into said inlet in an axial direction which is substantially parallel to said shaft while preventing substantial fuel contact with said shaft so that circumferential fuel swirl at said inlet is minimized.

2. The apparatus of claim 1 wherein said impeller comprises a plurality of short, straight blades extending radially from said shaft into an annular cavity formed within a surrounding housing; said inlet is an annular aperture in said housing opening into said cavity adjacent the radially innermost portion of said blades; and said outlet is a tangential passage leaving said cavity adjacent the radially outermost portion of said blades.

3. The apparatus of claim 2 further including antiswirl means, located at said inlet for preventing substantial circumferential flow in said annular inlet aperture.

4. The apparatus of claim 3 wherein said antiswirl means includes at least one baffle bridging said annular inlet aperture in a radial direction.

5. The apparatus of claim 1 further including a fuel pressure booster in fluid communication with said pump inlet and said source of fuel for supplying a constant, low pressure flow of fuel into said inlet.

6. The apparatus of claim 5 wherein said fuel pressure booster includes an injector body, a high pressure fuel inlet line which communicates with said pump outlet, a source fuel inlet line which communicates to a fuel storage tank, and a low pressure fuel outlet line which communicates to said pump inlet.

7. The apparatus of claim 5 further including an auxillary fuel tank adapted to contain sufficient fuel under pressure to initially prime said vortex pump.

8. The apparatus of claim 1 further including an electrically driven, positive displacement liquid pump in fluid communication between said vortex pump inlet and said source of fuel.

9. Fuel supply apparatus for a gas turbine engine, of the type having a rotatable drive shaft connecting at least one turbine wheel to at least one compressor wheel for high speed rotation and a combustor for supplying motive gases to said at least one turbine wheel, comprising in combination:
   a plurality of short, straight impeller blades extending radially from said rotatable shaft at a location intermediate said at least one turbine wheel and said at least one compressor wheel;
   a pump housing surrounding said impeller blades and defining an annular pump cavity in which said impeller blades can rotate with said shaft;
   a fuel outlet extending tangentially from the periphery of said annular pump cavity and in fluid communication with said combustor;
   a fuel inlet opening into said annular pump cavity in an axial direction and adjacent said shaft and in fluid communication with a source of fuel; and
   a fuel guide body adjacent said fuel inlet and surrounding said shaft, said guide body defining an annular fuel distribution channel having a fuel exit flow path which directs fuel in an axial direction, substantially parallel to said shaft, into said fuel inlet while preventing substantial fuel contact with said rotatable shaft so that circumferential fuel swirl at said inlet is minimized.

10. The apparatus of claim 9 wherein said fuel inlet is an annular aperture having at least one baffle bridging said aperture in a radial direction to prevent substantial circumferential fuel flow in said inlet.

11. The apparatus of claim 9 further including metering means for controlling fuel flow from said fuel outlet to said combustor and booster means for supplying a flow of fuel at low pressure to said fuel inlet.

12. The apparatus of claim 9 further including priming means for initially filling said pump cavity with fuel for starting said engine.

* * * * *

UNITED STATES PATENT AND TRADEMARK OFFICE
CERTIFICATE OF CORRECTION

PATENT NO. : 4,989,411

DATED : February 5, 1991

INVENTOR(S) : Jay N. Hoopes et al

It is certified that error appears in the above-identified patent and that said Letters Patent is hereby corrected as shown below:

On the title page item [22] Filed: reading "Dec. 27, 1988"

should read --Dec. 22, 1988--.

Signed and Sealed this

Thirtieth Day of June, 1992

Attest:

DOUGLAS B. COMER

*Attesting Officer*         *Acting Commissioner of Patents and Trademarks*